United States Patent [19]
Saitoh et al.

[11] Patent Number: 4,784,812
[45] Date of Patent: Nov. 15, 1988

[54] CERAMICS BINDER AND PRODUCTION OF CERAMICS ARTICLES

[75] Inventors: Katsuyoshi Saitoh, Kyoto; Tsunenori Sakai, Yamaguchi, both of Japan

[73] Assignee: Idemitsu Petrochemical Company Limited, Tokyo, Japan

[21] Appl. No.: 874,936

[22] Filed: Jun. 16, 1986

[30] Foreign Application Priority Data

Jun. 27, 1985 [JP] Japan ................. 60-141302

[51] Int. Cl.$^4$ .................. C04B 35/64; C08J 3/02
[52] U.S. Cl. .................... 264/63; 264/211.11; 264/328.2; 106/271; 106/124; 106/161; 106/191; 106/208; 106/213
[58] Field of Search ............... 106/272, 271, 124, 161, 106/191, 208, 213; 264/63, 109, 176.1, 177.11, 328.1, 328.2; 501/96, 153, 102, 92, 88, 53, 143, 141

[56] References Cited

U.S. PATENT DOCUMENTS

| 3,607,332 | 9/1971 | Wingfield | 106/272 |
| 3,953,218 | 4/1976 | Pollard | 106/272 |
| 4,336,071 | 6/1982 | Schnouer | 106/272 |
| 4,474,731 | 10/1984 | Brownlow et al. | 264/63 |
| 4,496,506 | 1/1985 | Sakuto et al. | 264/63 |
| 4,540,677 | 9/1985 | Enomoto et al. | 501/88 |

Primary Examiner—Josephine Barr
Attorney, Agent, or Firm—Armstrong, Nikaido, Marmelstein & Kubovcik

[57] ABSTRACT

Disclosed are a ceramics binder comprising an organic binding agent and adamantane and/or trimethylenenorbornane as a binding auxiliary, and a method for producing a ceramics article comprising mixing a ceramics raw material powder with a ceramics binder comprising an organic binding agent and adamantane and/or trimethylenenorbornane as a binding auxiliary, molding the resulting mixture by an injection molding method or an extrusion molding method to obtain a molded article, and sintering the molded article. When the ceramics binder is used in a dough for injection molding, the time required for eliminating the ceramics binder can be shortened and the content of the ceramics binder which remains in the molded articles after eliminating treatment can be reduced to a negligibly low level.

8 Claims, 1 Drawing Sheet

CERAMICS BINDER AND PRODUCTION OF CERAMICS ARTICLES

FIELD OF THE INVENTION

The present invention relates to a ceramic binder which upon production of ceramics articles as by injection molding enables one to carry out molding under mild conditions, shorten the period of time required for elimination of organic compounds and reduces the amount of remaining binder in molded articles, and to ceramics articles produced using such a ceramic binder.

BACKGROUND OF THE INVENTION

One of the conventional methods by which ceramics articles are produced is a method in which ceramics raw material powder and a binder are mixed to form a plastic dough which is injection molded into a desired shape, and the molded article is heated, e.g., at a temperature of from 400° to 500° C. to eliminate organic compounds, and then the article is sintered at a temperature of from 800° to 1800° C.

Conventional binder comprises a mixture of a thermoplastic resin as a main ingredient and an organic compound such as naphthalene, anthracene, camphor, phenanthrene, etc.

However, this type of binder is disadvantageous in that after elimination treatment of organic compounds from molded articles they remain in the article in a considerable amount and ceramics articles obtained by sintering molded articles tend to suffer a poor appearance since cracks and voids occur on the surface of the articles. In addition, when the above-described dough is injection molded, molding pressure becomes too high to continue injection molding. When the molding temperature is elevated in order to decrease the molding pressure, not only decomposition of binder occurs, thus giving rise to defective molding, but also it takes a long time to eliminate organic compounds from molded articles, resulting in poor productivity.

SUMMARY OF THE INVENTION

An object of the present invention is to provide a binder whose content in molded articles after elimination of organic compounds can be further reduced to a minimum when it is mixed with ceramics raw material powder and the resulting mixture is molded and heated for elimination of organic compounds.

Another object of the present invention is to provide a binder which can give rise to ceramics articles having no cracks or voids on the surface thereof when it is mixed with ceramics raw material powder and the resulting mixture is molded, heated for elimination of organic compounds and sintered.

Still another object of the present invention is to provide a binder which can be removed from molded articles in a short period of time when it is mixed with ceramics raw material powder and the resulting mixture is molded and heated for elimination of organic compounds.

Further, an object of the present invention is to provide a method for producing a ceramics article by injection molding or extrusion molding at a lower molding temperature and pressure than is used conventionally to produce ceramics articles having a good appearance.

These objects of the present invention can be attained by the use of a ceramics binder comprising an organic binding agent, and adamantane and/or trimethylenenorbornane (hereinafter, sometimes referred to as "a binding auxiliary").

BRIEF DESCRIPTION OF DRAWING

Single FIGURE is a perspective view of a molded ceramics article according to a preferred embodiment of the present invention.

DETAILED DESCRIPTION OF THE INVENTION

Figure 1:
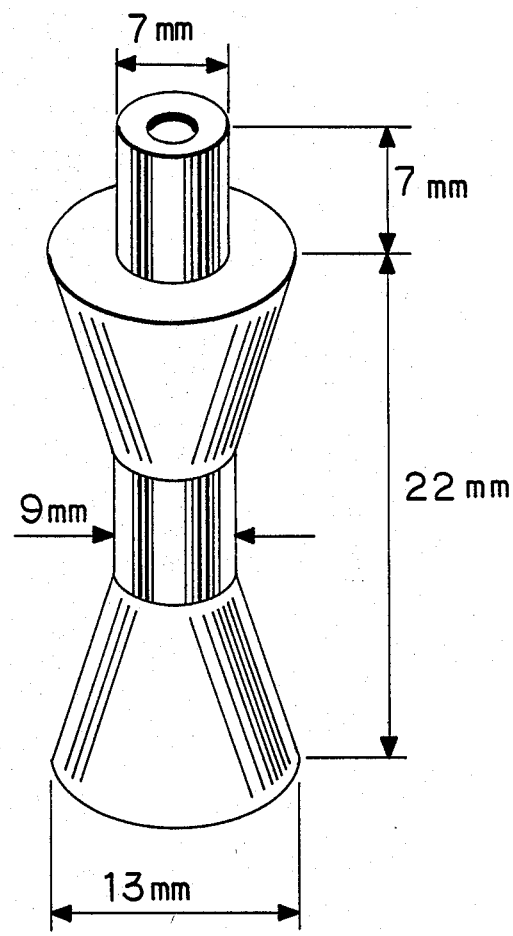

A ceramics binder comprising an organic binding agent and a binding auxiliary is mixed with ceramics raw material powder to form a dough.

As for the organic binding agent, any conventional binding agent can be used. Suitable examples thereof include thermoplastic resins such as a polyethylene, an atactic polypropylene, a polybutene, a polystyrene, an ethylene-vinyl acetate copolymer, a polybutyl methacrylate, cellulose acetate, an acrylic resin, etc., water-soluble binders such as a polyvinyl alcohol, sugar, carboxymethylcellulose, starch, dextrin, gelatin, molasses, pulp waste liquor, peptone, a polyvinyl ether, etc., organic solvent-soluble binders such as ethylcellulose, acetylcellulose, wax, liquid paraffin, heavy oil, machine oil, phenol resins, ethyl silicate, etc.

When the ceramics binder of the present invention is used in a dough for injection molding, it is preferred to use as the organic binding agent at least one member selected from the group consisting of a polyethylene, an atactic polypropylene, a polystyrene, an ethylene-vinyl acetate copolymer, a polybutyl methacrylate and wax. These binding agents can be used singly or in admixture.

In the present invention, it is essential that the ceramics binder is comprised of a mixture of the abovedescribed organic binding agent with adamantane and/or trimethylene-norbornane, preferably endotrimethylenenorbornane, as a binding auxiliary.

The blend ratio of the organic binding agent to the binding auxiliary varies depending on the kind of the ceramics raw material powder. Generally, the organic binding agent can be used in an amount of from 0.5 to 50 parts by weight, prefereably from 5 to 30 parts by weight, per 100 parts by weight of the ceramics raw material powder, while the binding auxiliary can be used in an amount of from 0.1 to 15 parts by weight, preferably from 2 to 8 parts by weight, per 100 parts by weight of the ceramics raw material powder.

The ceramics binder of the present invention can contain various additives such as a plasticizer, a lubricant, etc., in addition to the organic binding agent and the binding auxiliary.

Suitable examples of the plasticizer include diethyl phthalate, dibutyl phthalate, dioctyl phthalate, fatty acid esters, etc. As for the lubricant, there can be illustrated aluminum stearate, magnesium stearate, diglycol stearate, flour, mineral oil, etc.

In the case of injection molding, a dough obtained by mixing ceramics raw material powder with the ceramics binder of the present invention has an excellent flowability on heating without the addition of additives such as the plasticizer and the lubricant, resulting in that the injection-molded articles have an excellent surface appearance.

Suitable examples of the ceramics raw material include non-plastic materials such as silica, feldspar, toseki (pottery stone), lithium minerals, sillimanite, alumina, zirconia, silicon carbide, silicon nitride, etc., and plastic materials such as kaolin, plastic clay, fire clay., etc.

Of course, the ceramic raw material must be subjected to pulverization, wet mixing, sifting, removal of impurities, and the like prior to mixing with the ceramics binder of the present invention in the same manner as in the case of producing conventional ceramics articles.

Mixing of the ceramics raw material with the ceramics binder of the present invention can be carried out by kneading, which can be performed, for example, at a temperature of from 80° to 160° C., preferably from 100° to 120° C., for from 0.5 to 3 hours, preferably from 0.5 to 1 hour. Kneading can be carried out using a ball mill, a plastomill, a hot kneader, a cokneader, a kneader which can heat and give a shearing force to a mterial to be processed, etc. Mixing can be carried out in various manners. For example, at first a binding agent and a binding auxiliary are mixed with each other sufficiently to prepare a ceramics binder, and then the ceramics binder is mixed with a ceramics raw material powder. Alternatively, a ceramics raw material powder, a binding agent and a binding auxiliary are mixed simultaneously or subsequently.

The dough thus obtained can be molded into a desired shape by a conventional method for molding ceramics such as a soft mud method, a semi-soft mud method, a plastic pressure molding method, a driven potter's wheel method, a roller machine method, an extrusion molding method, a hard mud method, a hydrostatic press method (a rubber press method), a stuffing method, a hot press method, an injection molding method, etc.

Among these methods, an injection molding method is particularly preferred since a dough containing the ceramics binder of the present invention can be injection molded sufficiently at such a temperature and pressure that a dough which does not contain the ceramics binder of the present invention cannot be molded satisfactorily, and a period of time required for elimination of organic compounds can be shortened considerably.

The method for producing ceramics articles using an injection molding in acordance with the present invention is described in detail below.

That is, the ceramics raw material powder and the ceramics binder are hot kneaded to obtain a dough, which then is converted into pellets or powders for use as a molding material by granulation using rolls, pelletization using a pelletizer, size reduciton by cold grinding using a kneader, pulverization by extruding the dough in the form of sheet using rolls, and the like. This molding material is supplied to a plunger type, preplasticating type or screw in-line type injection molding machine to give an molded article.

The injection molding can be carried out at a temperature of from 80° to 205° C. and at a pressure of from 300 to 1,500 kg/cm².

Then the molded article is subjected to elimination treatment to remove the ceramics binder. The eliminating treat-ment can be carried out by heating the molded articles usually at a temperature of from 20° to 450° C. for from 15 to 40 hours. It should be noted that in this eliminating treatment, the ceramics binder of the present invention can be removed in a period of time much shorter than that required for removing a conventional binder and the amount of the remaining ceramics binder of the present invention is very small.

After the eliminating treatment, the molded article is sintered to produce a ceramics article.

The ceramics binder of the present invention comprises a mixture of a conventional binding agent with a specific compound as a binding auxiliary, and as a result, when a dough prepared by mixing it with a ceramics raw material powder is molded into an article and the ceramics binder in this molded article is eliminated, the amount of the ceramics binder remaining in the molded article is small as compared with the case where an article molded from a dough using a conventional binder is subjected to elminating treatment, and thus giving rise to a ceramics article having a beautiful surface without defects such as cracks and voids.

The above-described advantages of the ceramics binder of the present invention are attainable not only in the case of ceramics articles produced using injection molding but also in the case of ceramics articles produced using other molding methods.

Particularly, when the ceramics binder of the present invention is used in a dough for injection molding, the time required for elimination treatment of ceramics binder can be shortened and the content of the ceramics binder which remains in the molded articles after degreasing treatment can be reduced to a negligibly small level.

Hereinafter, the present invention will be described in greater detail with reference to examples and comparative examples. However, the present invention is not to be construed as being limited to these examples.

EXAMPLES 1 TO 6 AND COMPARATIVE EXAMPLES 1 TO 4

Various kinds of ceramics raw materials shown in Tables 1 and 2, various kinds of binding agents shown in Table 1 and various kinds of binding auxiliaries were kneaded in ratios shown in Table 1 at a temperature of 100 ~ ±10° C. for 30 minutes using a laboratory plastomill at a torque of 50 kg.cm.

Then, the thus-kneaded material was reduced in size using a hand press and then further ground to form a bulk material of from 5 to 7 mm.

The bulk material was injection molded using an injection molding machine (produced by Yamashiro Seiki Co. Ltd., vertical plunger type) under molding conditions shown in Table 1 to form molded articles having a shape shown in Table 1.

The ceramic binder in molded articles was eliminated under the conditions shown in Table 1, and thereafter sintered at a temperature of 1,620° C. (temperature increase rate: 100° C./hr) to form ceramics articles.

The appearance of the ceramics articles was evaluated by naked eye. The results obtained are shown in Table 1.

TABLE 1

| | Composition | | | | | |
|---|---|---|---|---|---|---|
| | Ceramics Raw Material | | Binding Agent | | Binding Auxiliary | |
| | Kind | Amount (wt) | Kind | Amount (wt) | Kind | Amount (wt) |
| Ex. 1 | Alumina | 100 | EVA | 8 | AD | 7 |
| Ex. 2 | Alumina | 100 | EVA (5) PBA (5) | 10 | endo-TMN | 5 |

TABLE 1-continued

| | | | | | | |
|---|---|---|---|---|---|---|
| Ex. 3 | Alumina | 100 | EVA (4.5) PS (4.5) | 9 | AD (1.2) endo-TMN (4.8) | 6 |
| Ex. 4 | Zirconia | 100 | PE (4.5) PBA (4.5) | 9 | AD (1) endo-TMN (4) | 5 |
| Ex. 5 | Silicon Carbide | 100 | PS (7.5) PBA (7.5) | 15 | endo-TMN | 4 |
| Ex. 6 | Silicon Nitride | 100 | EVA (8) WAX (8) | 16 | AD (1) endo-TMN (4) | 5 |
| C. Ex. 1 | Alumina | 100 | PE (6.5) PS (6.5) | | Anthracene | 3 |
| C. Ex. 2 | Zirconia | 100 | APP (8) PE (8) | 16 | Anthracene | 4 |
| C. Ex. 3 | Silicon Carbide | 100 | PE (8) EVA (8) | 16 | Naphthalene | 4 |
| C. Ex. 4 | Silicon Nitride | 100 | APP (8) EVE (8) | 16 | Naphthalene | 4 |

| | Molding Condition | | Condition | | | |
|---|---|---|---|---|---|---|
| | Temp. (°C.) | pres. (Kg/cm$^2$) | Temp. (°C.) | Time (hrs) | Amount of Remaining Binder (wt %) | Appearance |
| Ex. 1 | 150 | 660 | 20→420 | 24 | below 1 | No crack, void etc. Good appearance |
| Ex. 2 | 120 | 660 | 20→420 | 24 | below 1 | the same as the above |
| Ex. 3 | 130 | 660 | 20→420 | 24 | below 1 | the same as the above |
| Ex. 4 | 140 | 660 | 20→420 | 30 | below 1 | the same as the above |
| Ex. 5 | 150 | 660 | 20→500 in air | 35 | below 1 | the same as the above |
| Ex. 6 | 150 | 660 | 20→500 in N$_2$ | 36 | below 1 | the same as the above |
| C. Ex. 1 | 180 | 680 | 20→400 | 68 | 4.0 | Cracks, voids, etc. are observed. Poor appearance |
| C. Ex. 2 | 160 | 800 | 20→400 | 67 | 3.0 | the same as the above |
| C. Ex. 3 | 170 | 900 | 20→400 in air | 70 | 2.5 | the same as the above |
| C. Ex. 4 | 160 | 900 | 20→400 in N$_2$ | 80 | 3.5 | the same as the above |

PS; Polystyrene, CR-3500, a product by Dai-Nippon Ink Co., Ltd.
EVA; Ethylene-Vinyl acetate copolymer, UF 633, a product by Toyo Soda Manufacturing Co., Ltd.
PBA; Polybutyl methacrylate, CB-1, a product by Sanyo Kasei Kogyo Co., Ltd.
PE; Polyethylene, Sumikathene G808, a product by Sumitomo Chemical Co., Ltd.
WAX; ND-793, a product by Chukyo Yushi Co., Ltd.
APP; Atactic polypropylene, Polyone, a product by Mitsubishi Yuka Co., Ltd.
AD; Adamantane
TMN; Trimethylenenorbornane

TABLE 2

| | Specific Surface Area (m$^2$/g) | Average Particle Size |
|---|---|---|
| Alumina | 7 | 0.5 μm |
| Zirconia | 13 | 200 Å |
| Silicon Carbide | 15 | 0.3 μm |
| Silicon Nitride | 10 | 0.2 μm |

While the invention has been described in detail and with reference to specific embodiments thereof, it will be apparent to one skilled in the art that various changes and modifications can be made therein without departing from the spirit and scope thereof.

What is claimed is:

1. A ceramics binder which comprises 0.5-50 parts by weight of at least one organic binding agent selected from the group consisting of a thermoplastic resin, a water-soluble binder and an organic solvent-soluble binder and 0.1-15 parts by weight of least one binding auxiliary selected from the group consisting of adamantane and trimethylenenorbornane.

2. A ceramics mixture for molding articles comprising a ceramics binder which comprises 0.5-50 parts by weight of at least one organic binding agent selected from the group consisting of a thermoplastic resin, a water-soluble binder and an organic solvent-soluble binder and 0.1-15 parts by weight of at least one binding auxiliary selected from the group consisting of adamantane and trimethylenenorbornane and 100 parts by weight of ceramics raw material powder.

3. A method for making a ceramic article which comprises the following steps: mixing 0.6-65 parts by weight of a ceramics binder comprising 9.5-50 parts by weight of at least one organic binding agent selected from the group consisting of a thermoplastic resin, a water-soluble binder and an organic solvent-soluble binder and 9.1-15 parts by weight of at least one binding auxiliary selected from the group consisting of adamantane and trimethylenenorbornane with 100 parts by weight of a ceramics raw material powder at 80°-150° C., molding the resulting mixture by injection molding or extrusion molding, and sintering the molded article.

4. A ceramics binder as claimed in claim 1, wherein said organic binding agent is at least one member selected from the group consisting of an ethylene-vinyl acetate copolymer, a polybutyl methacrylate, a polystyrene, a polyethylene, a polypropylene and wax.

5. A ceramics binder as claimed in claim 1, wherein said trimethylenenorbornane is endodtrimethylenenorbornane.

6. A ceramics binder as claimed in claim 1, wherein said ceramics binder further contains a member of the group consisting of plasticizer and a lubricant.

7. A method as claimed in claim 3, wherein said ceramics raw material powder is at least one member selected from the group consisting of alumina, zirconia, silicon nitride and silicon carbide.

8. A method as claimed in claim 3, wherein said ceramics raw material powder is at least one member selected from the group consisting of alumina, zirconia silicon nitride and silicon carbide

* * * * *